United States Patent [19]

Rider et al.

[11] Patent Number: 4,948,225

[45] Date of Patent: Aug. 14, 1990

[54] NONLINEAR OPTICAL ARTICLE FOR MODULATING POLARIZED LIGHT

[75] Inventors: Christopher B. Rider; Michael Scozzafava; Jay S. Schildkraut, all of Rochester, N.Y.

[73] Assignee: Eastman Kodak Company, Rochester, N.Y.

[21] Appl. No.: 419,984

[22] Filed: Oct. 11, 1989

[51] Int. Cl.$^5$ .......................... G02B 6/00; B32B 9/04; B05D 5/06; F21V 9/14

[52] U.S. Cl. .............................. 350/96.34; 350/96.13; 350/96.14; 350/96.17; 350/96.30; 350/374; 350/385; 350/394; 350/395; 350/356; 428/411.1; 427/163; 252/585; 307/425; 307/427; 307/430

[58] Field of Search ............... 350/96.13, 96.14, 96.15, 350/96.16, 96.17, 96.20, 96.29, 96.30, 96.34, 370, 374, 376, 377, 394, 395, 356, 357, 311, 384, 385; 428/411.1; 427/163; 252/585; 307/425, 427, 430

[56] References Cited

U.S. PATENT DOCUMENTS

| | | | |
|---|---|---|---|
| 2,441,668 | 5/1948 | Mathers et al. | 423/178 X |
| 3,176,575 | 4/1965 | Socha | 350/164 X |
| 3,650,601 | 3/1972 | Bierlein | 350/377 |
| 3,883,214 | 3/1975 | Hoffman | 350/1 |
| 4,089,582 | 5/1978 | Mahlein et al. | 350/96.13 |
| 4,249,796 | 2/1981 | Sincerbox et al. | 350/370 |
| 4,451,123 | 5/1984 | McNeill et al. | 350/386 |
| 4,666,235 | 5/1987 | Pavlath | 350/96.15 |
| 4,695,123 | 9/1987 | Chang et al. | 350/96.15 |
| 4,721,352 | 1/1988 | Sorin et al. | 350/96.15 |
| 4,722,583 | 2/1988 | Stewart | 350/96.15 |
| 4,725,113 | 2/1988 | Chang et al. | 350/96.15 |
| 4,729,622 | 3/1988 | Pavlath | 350/96.15 |
| 4,786,128 | 11/1988 | Birnbach | 350/96.14 |
| 4,792,208 | 12/1988 | Ulman et al. | 350/96.34 |
| 4,796,971 | 1/1989 | Robello et al. | 350/96.34 |
| 4,895,422 | 1/1990 | Rand et al. | 350/96.15 |

OTHER PUBLICATIONS

D. J. Williams, "Organic Polymeric and Non-Polymeric Materials with Large Optical Nonlinearities", *Angew. Chem. Int. Ed. Engl.* 23 (1984) 690-703.

Zyss "Nonlinear Organic Materials for Integrated Optics", *Journal of Molecular Electronics*, vol. 1, pp. 25-45, 1985.

Sarid, "Long-Range Surface-Plasmon Waves on Very Thin Metal Films", *Phys. Rev. Lett.*, vol. 47, No. 26, Dec. 1981, pp. 1927-1930.

Persegol et al., "A Novel Type of Light Modulator", SPIE, vol. 864, Advanced Optoelectronic Technology (1987), pp. 42-44.

Schildkraut, "Long Range Surface Plasmon Electrooptic Modulator", *Applied Optics*, vol. 21, Nov. 27, No. 1, 1988, pp. 4587-4590.

*Primary Examiner*—Brian Healy
*Attorney, Agent, or Firm*—Carl O. Thomas

[57] ABSTRACT

A nonlinear optical article for the controlled propagation of electromagnetic radiation is disclosed. The article includes a reflective metal layer having a thickness in the range of from 100 to 1000 Å and work function in the range of from 2.5 to 4.5 eV, an optical coupler, a dielectric medium comprised of a poled polymeric layer exhibiting a glass transition temperature of at least 50° C. and a second order polarization susceptibility greater than $10^{-9}$ electrostatic units, and means for variably applying an electrical potential to a surface of the dielectric medium remote from the reflective metal layer. A protective metal fluoride or oxide layer having a thickness of less than 0.1 μm is interposed between the reflective metal layer and the poled polymeric layer.

20 Claims, 2 Drawing Sheets

NONLINEAR OPTICAL ARTICLE FOR MODULATING POLARIZED LIGHT

FIELD OF THE INVENTION

The invention relates to optical articles for the nonlinear propagation of electromagnetic radiation.

BACKGROUND OF THE INVENTION

Nonlinear optics is concerned with the interactions of electromagnetic fields in various media to produce new fields altered in phase, frequency, amplitude, or other propagation characteristics from the incident fields. In order to gain an insight into the origin of nonlinear optical effects, the polarization P induced in a molecule by a local electric field E can be expressed by Equation 1:

$$P = \alpha E + \beta E^2 + \gamma E^3 \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

The macromolecular level terms of Equation 2 are first order $\chi^{(1)} E$, second order polarization $\chi^{(2)} E^2$, and third order polarization $\chi^3 E^3$.

D. J. Williams, "Organic Polymeric and Non-Polymeric Materials with Large Optical Nonlinearities", *Angew. Chem.* Int. Ed. Engl. 23 (1984) 690–703, and Zyss "Nonlinear Organic Materials for Integrated Optics", *Journal of Molecular Electronics*, Vol. 1, pp. 25–45, 1985, disclose a variety of nonlinear optical end uses that can be served by utilizing $\chi^{(2)}$ or $\chi^{(3)}$ properties of a propagation medium.

Interest in nonlinear optical devices has particularly centered on devices relying on second order polarization susceptibilities. To achieve on a macromolecular level second order polarization ($\chi^{(2)} E^2$) of any significant magnitude, it is essential that the transmission medium exhibit high (herein employed to mean greater than $10^{-9}$ electrostatic units) second order polarization susceptibilities. To realize such values of $\chi^{(2)}$ it is necessary that the second polarizability $\beta$ be greater than $10^{-30}$ electrostatic units (esu).

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, non-centrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

For a number of years the materials employed for achieving second order polarization effects were non-centrosymmetric inorganic crystals, such as potassium dihydrogen phosphate and lithium niobate. Williams postulates mathematically and experimentally corroborates second order polarization susceptibilities in organic molecular dipoles equalling and exceeding those of conventional inorganic dipoles.

A technique that has been found useful in obtaining high $\chi^{(2)}$ organic molecular dipole layers for the nonlinear propagation of electromagnetic radiation is to incorporate the organic dipoles in a polymeric medium having a glass transition well above ambient temperatures. The organic molecular dipoles can form a part of the polymer molecule or simply blended with the polymer. While the polymeric medium is heated above its glass transition temperature, an electric field gradient is placed across the medium. The organic molecular dipoles align themselves with the electric field gradient. With the electric field applied the polymeric medium is cooled to below its glass transition temperature, thereby locking the organic dipoles in a polar aligned, non-centrosymmetric arrangement essential to achieving high $\chi^{(2)}$ values. The technique is commonly referred to as poling, and high $\chi^{(2)}$ layers so generated are commonly referred to as poled polymeric layers. Ulman et al. U.S. Pat. No. 4,792,208 and Robello et al. U.S. Pat. No. 4,796,971 are cited as illustrative of a number of patents disclosing poled polymeric media.

Metal fluorides and oxides have been employed with optical articles, such as lenses. Mathers et al. U.S. Pat. No. 2,441,668; Socha U.S. Pat. No. 3,176,575; and Hoffman U.S. Pat. No. 3,883,214 are illustrative.

An art recognized class of nonlinear optical articles are those that modulate reflection, either for the purpose of controlling the intensity or polarization of reflected electromagnetic radiation. Devices intended for this purpose, commonly referred to as attenuated total reflection devices or ATR's, are illustrated by ATR-1 Sincerbox et al U.S. Pat. No. 4,249,796;
ATR-2 McNeill et al U.S. Pat. No. 4,451,123;
ATR-3 Sarid, "Long-Range Surface-Plasmon Waves on Very Thin Metal Films", Phys. Rev. Lett., Vol. 47, No. 26, Dec. 1981, pp. 1927–1930;
ATR-4 Persegol et al, "A Novel Type of Light Modulator", SPIE Vol. 864, Advanced Optoelectronic Technology (1987) pp. 42–44;
ATR-5 Schildkraut, "Long Range Surface Plasmon Electrooptic Modulator", Applied Optics, Vol. 27, No. 21, Nov. 1, 1988, pp. 4587–4590.

RELATED PATENT APPLICATIONS

Dao HIGH $\chi^{(2)}$ OPTICAL ARTICLE WITH IMPROVED BUFFER LAYER U.S. Ser. No. 419,819, concurrently filed, pending, commonly assigned, discloses an optical article with a high $\chi^{(2)}$ poled polymeric medium formed on a buffer layer comprised of low molecular weight aromatic compound and a metal fluoride or oxide.

Schildkraut et al OPTICAL ARTICLE FOR REFLECTION MODULATION U.S. Ser. No. 419,817, pending, concurrently filed, commonly assigned, discloses an optical article intended for modulation of reflected electromagnetic radiation comprised of a prism support onto which are formed in sequence (a) a layer formed of at least one of a metal fluoride or oxide or a low molecular weight aromatic compound, (b) a negative dielectric constant layer, (c) a layer exhibiting a change in its refractive index as a function of a potential bias impressed upon it, and (d) an electrode.

SUMMARY OF THE INVENTION

Although ATR's have been theoretically explored and actually constructed, few, if any, practically attractive ATR constructions have been reported. In one form conventional ATR's are comprised of (a) a reflective metal layer having a thickness in the range of from 100 to 1000 Å comprised of at least one metal having a work function in the range of from 2.5 to 4.5 electron volts (eV), (b) means for directing polarized electromagnetic radiation to and acting as a support for the reflective metal layer, (c) a dielectric medium capable of exhibiting a change in its refractive index as a function of an applied electrical potential gradient overlying the reflective metal layer, and (d) means for variably applying an electrical potential to a surface of said dielectric medium remote from said reflective metal layer.

The present invention stems from attempting to employ for (c) a poled polymeric layer exhibiting a glass transition temperature of at least 50° C. and a second order polarization susceptibility greater than $10^{-9}$ esu. In preparing optical articles containing a poled polymeric layer it is common practice to spin cast or otherwise coat the polymeric layer containing the organic molecular dipoles on a metal surface. While many metals are available which are stable when brought into contact with the polymeric layer at ambient temperatures, a problem has arisen of unwanted interactions between the poled polymer layer and the metal surface before and during poling. Solvents used in spin coating can interact deleteriously with the metal surfaces. Heating to temperatures well above above ambient, essential to achieving stable poled layers, makes the metal surfaces particularly susceptible to chemical attack.

The present invention is directed to an ATR construction that allows a high $\chi^{(2)}$ poled polymeric layer to be employed that requires elevated poling temperatures while protecting the reflective metal layer from degradation.

In one aspect, this invention is directed to an optical article capable of modulating the reflection of electromagnetic radiation comprising a reflective metal layer having a thickness in the range of from 100 to 1000 Å comprised of at least one metal having a work function in the range of from 2.5 to 4.5 eV, means for directing polarized electromagnetic radiation to and acting as a support for said reflective metal layer, a dielectric medium capable of exhibiting a change in its refractive index as a function of an applied electrical potential gradient overlying said reflective metal layer, and means for variably applying an electrical potential to a surface of said dielectric medium remote from said reflective metal layer.

The invention is characterized in that the dielectric medium is comprised of a poled polymeric layer exhibiting a glass transition temperature of at least 50° C. and a second order polarization susceptibility greater than $10^{-9}$ electrostatic units and a protective layer having a thickness of less than 0.1 $\mu$m consisting essentially of at least one of a metal oxide and a metal fluoride is interposed between the reflective metal layer and the poled polymeric layer.

It is surprising that a layer having a thickness of less than 0.1 $\mu$m can afford protection of the reflective metal layer, since layers in the 100 Angstrom thickness ranges are known to provide less than pin-hole free coverages. It is even more surprising that a layer can be interposed between the interface of the poled polymeric layer and the reflective metal layer while retaining the capability of modulating reflection. It is generally accepted that the propagation of an evanescent portion of the electromagnetic radiation received for reflection along the interface of the variable refractive index dielectric medium and the reflective metal layer is relied upon for attenuation. Separating the variable refractive index dielectric medium and the reflective metal layer would appear on its face to be incompatible with this capability.

DESCRIPTION OF PREFERRED EMBODIMENTS

The invention is applicable to the propagation of electromagnetic radiation in the wavelength ranges commonly encountered by nonlinear optical articles—e.g., wavelengths ranging from the near ultraviolet, typically 300 to 400 nm, through the visible of 400 to 700 nm and well into the infrared up to wavelengths of 2.0 $\mu$m or more. The optical articles of the invention are particularly useful with solid state lasers providing input wavelengths in the range from about 550 to 1500 nm. Second harmonic wavelengths internally generated are, of course, half the input radiation wavelengths.

Figure 1:
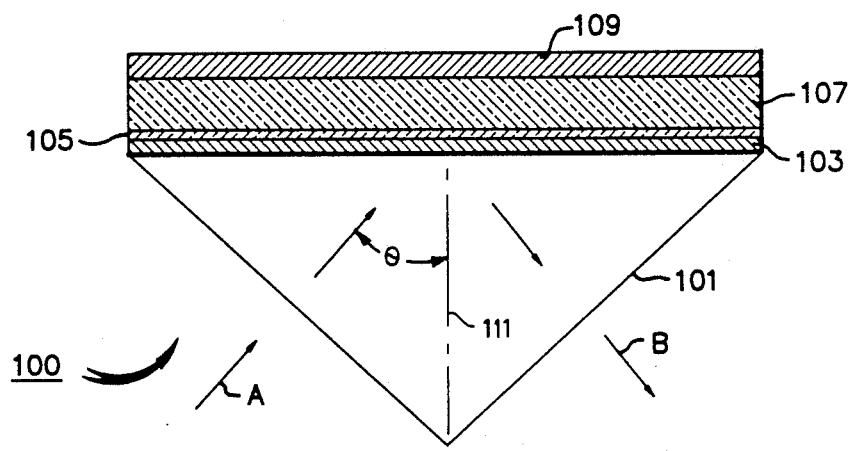
FIG. 1 is a schematic view of a nonlinear optical article according to the invention including a prism for optical coupling and FIG. 2 is a schematic view of another nonlinear optical article according to the invention including an optical fiber for optical coupling.

In FIG. 1 an attenuated total reflection optical article 100 capable of modulating reflection by controlled attentuation of received electromagnetic radiation is illustrated. Electromagnetic radiation is shown at A to be optically coupled into the article through prism 101 at an angle of incidence $\Theta$ measured from the axis 111, which is perpendicular to the base of the prism. In one operating condition of the optical article substantially all of the electromagnetic radiation received is reflected, as indicated at B. In varied operating conditions the optical article is capable of attenuating the electromagnetic radiation. The optical article 100 can be employed as a switch or modulator for reflected electromagnetic radiation.

On the base of the prism is coated a reflective metal layer 103. A protective layer 105 overlies the reflective metal layer, and a poled polymeric layer 107 capable of exhibiting a change in its refractive index as a function of an applied electrical potential gradient overlies the protective layer. The device is completed by an electrode 109 or similar suitable means for applying an electrical potential gradient across the poled polymeric layer.

The metal layer is sufficiently thick to be reflective, at least 100 Å (preferably at least 150 Å), yet is sufficiently thin to be penetrable by the electromagnetic radiation, no thicker than about 1000 Å (preferably no thicker than about 700 Å).

The reflective metal layer can be formed of one or a combination of moderate work function metals—that is, any metal having a work function in the range of from about 2.5 to 4.5 electron volts (eV), preferably in the range of from 3.5 to 4.5 eV. These metals are sufficiently stable for use under commonly encountered ambient conditions, but are susceptible to oxidation under the more stringent conditions encountered during poling. At the lower end of the work function range (2.5 to 3.5 eV) are metals such as the rare earth elements and alkaline earth elements, such as calcium and barium. Metals in the preferred upper portion of the work function range (3.5 to 4.5 eV) include a wide variety of non-noble metals commonly employed for electrode fabrication in electronic and optical devices. Typical useful metals in the upper portion of the work function range (3.5 to 4.5 eV) include magnesium, indium, titanium, aluminum, nickel, copper, zinc, silver, tin, antimony, and bismuth. Alloys of the various metals are, of course, contemplated.

It has been discovered that a metal fluoride or oxide coated over the moderate work function reflective metal layer can protect this layer from degradation at the elevated temperatures of poling, yet does not interfere with propagation of electromagnetic radiation. Surprisingly, adequate protection of the poling electrode is achieved even when the metal fluoride or oxide is deposited in such limited amounts that an entirely continuous, pin hole free coating is not realized. Measurable levels of protection have been observed at layer thicknesses as low as 10 Å. Layer thicknesses of at least 50 Å are preferred.

The maximum protective layer thickness contemplated is less than 0.1 μm (i.e., less than 1000 Å), preferably less than 700 Å. It is essential to limit the thickness of the protective layer to permit the necessary optical coupling of the reflective metal layer and the overlying poled polymeric layer required for attenuation of electromagnetic radiation. Specifically, in the absence of the protective layer, attenuation is achieved by propagating an evanescent portion of the electromagnetic radiation incident upon the reflective metal layer along the interface between the poled polmeric layer and the reflective metal layer. By limiting the thickness of the protective layer to less than 0.1 μm sufficient optical coupling between the reflective metal layer and the polymeric layer remains to retain this interface propagation capability.

Since oxygen and fluorine generally form relatively inert stable compounds with metals, it is apparent that the protective layer can be formed from a broad selection of metal fluorides and oxides. Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional technique for depositing the metal fluoride or oxide layer compatible with the metal surface onto which deposition is intended can be undertaken. Vacuum vapor deposition, sputtering, chemical vapor deposition, molecular beam epitaxy, liquid phase epitaxy, electrolytic oxidative coating, and similar conventional coating processes can be employed. While these deposition techniques lend themselves to forming protective layers of less than 0.1 μm in thickness, they do not lend themselves to forming thicker layers.

It is specifically contemplated to form metal fluoride coatings by the thermal decomposition of a metal carboxylate (e.g., a metal acetate or 2-ethylhexanoate) in the presence of fluorinating agent (e.g., heptafluorobutyric acid). This method is the subject matter of Paz-Pujalt U.S. Ser. No. 377,646, filed July 10, 1989, pending, titled METHOD OF FORMING METAL FLUORIDE FILMS BY THE DECOMPOSITION OF METALLOORGANIC FILMS IN THE PRESENCE OF A FLUORINATING AGENT, commonly assigned.

The polymeric layer 107 overlies the protective layer. The polymeric layer contains organic molecular dipoles. The organic molecular dipoles can themselves form a portion of a polymer as pendant or backbone repeating units. Alternatively, the organic molecular dipoles can be mixed with a separate polymer to form the polymeric layer. The organic molecular dipoles are more or less randomly aligned as originally deposited. In other words, the polymeric layer lacks the degree of non-centrosymmetric alignment of organic molecular dipoles essential to achieve high $\chi^{(2)}$ values.

To achieve the high second order polarization (high $\chi^{(2)}$) properties essential for completed device, the article 100 as shown is provided with electrode 109, which can be employed for poling. By applying an electrical potential gradient between the electrode and the reflective metal layer with the polymeric layer heated to a temperature above its glass transition temperature ($T_g$) the organic molecular dipoles have freedom of mobility to align themselves in the applied electrical field. By cooling the polymeric layer below its glass transition temperature while maintaining the applied electrical field, the organic molecular dipoles are immobilized in their non-centrosymmetrically arranged field aligned position, thereby imparting to the polymeric layer the desired high $\chi^{(2)}$ (second order polarization susceptibility of greater than $10^{-9}$ esu).

To avoid having the field imparted poling lost as soon as the applied potential gradient is relaxed, it is necessary to select the polymeric layer to have a $T_g$ well above ambient temperatures. Generally, the polymeric layer should have a $T_g$ of at least 50° C., with a $T_g$ of 80° C. or more being preferred.

Instead of constructing the optical article 100 as shown with the electrode 109 present during poling, it is alternatively possible to pole the device by corona charging the bare surface of the polymeric layer. This entails establishing an electrical potential between the reflective metal layer 102 and a corona charging electrode (not shown) located above and spaced from the surface of the polymeric layer. The corona induces a charge on the surface of the polymeric layer that acts a counter electrode for the reflective metal layer. Apart from the difference in the counter electrode construction, the poling procedure is otherwise similar to that described above.

With both of the poling procedures the protective layer 105 constitutes a resistance in series with the polymeric layer. Since the resistivity of metal fluorides and oxides is much higher than that of the polymeric media, limiting the thickness of the protective layer to less than 0.1 μm serves an important function in reducing the series resistance of this layer. This allows a greater proportion of the field gradient applied during poling to occur within the polymeric layer, where it is available for orienting the organic dipoles.

In operation, when the angle of incident polarized electromagnetic radiation is properly chosen a portion of the electromagnetic radiation forms a wavefront that is guided along the interface of the reflective metal layer 103 and the high $\chi^{(2)}$ poled polymer layer 107, hereinafter referred to as the internal propagation interface. Although the protective layer is interposed between the layers 103 and 107, by limiting its thickness to less than 0.1 μm it does not interfere with optical coupling of the moderate work function metal and the poled polymeric layer.

To modulate the percentage of the electromagnetic radiation travelling along the internal propagation interface and consequently the percentage of the electromagnetic radiation reflected the electrical potential of the reflective metal layer relative to that of the electrode 109 is varied. Any change in the potential difference between the metal layer and the electrode 109 changes the refractive index of the poled polymeric layer. This in turn changes the ability of the device to propagate a portion of the incident electromagnetic radiation along the internal propagation interface.

For example, in one mode of operation the angle of incidence of electromagnetic radiation can be chosen to favor maximum attenuation along the internal propagation interface with no electrical potential difference applied between the metal layer and the electrode. By applying a potential difference, the amplitude of the reflected electromagnetic radiation is increased. Alternatively, the angle of incidence of the electromagnetic radiation can be chosen so that at a selected potential difference between the reflective metal layer and the electrode maximum propagation along the internal propagation interface occurs, with reflection being increased upon either decreasing (including eliminating) or increasing the potential difference between the metal layer and the electrode.

In the mode of operation described above, the optical article is relying on surface plasmon generation for modulation. It is also possible to operate the device as a guided mode device. By reducing the angle Θ attenuation can be shifted into the polymeric layer. A choice of angles are available for achieving guided mode operation. Generally best results are achieved at the first (zero order) guided mode angle Θ encountered below the value of Θ that produces a surface plasmon.

The degree of attenuation of the electromagnetic radiation that can be realized can be increased by modifying optical article 100 by locating a dielectric layer having a thickness in the range of from 0.1 to 10 times the wavelength of the electromagnetic radiation between the metal layer 103 and the prism (or other coupling element). This interposed dielectric layer is chosen to have a refractive index that matches that of the poled polymeric layer under at least one condition of use. The theoretical bases for the performance advantages that can be realized by optical articles of this type are discussed by J. S. Schildkraut, "Long-range Surface Plasmon Electrooptic Modulator", *Applied Optics*, Vol. 27, No. 21, pp. 4587–4590, Nov. 1988, the disclosure of which is here incorporated by reference. Such a device can be constructed as disclosed by Schildkraut et al. in the concurrently filed patent application cited above.

Although optical article 100 is shown to be formed on the base of a prism, it is appreciated that the optical articles of this invention can be formed on any conventional optical coupling substrate, such as an optical grating or a waveguide (e.g., an optical fiber).

Figure 2:
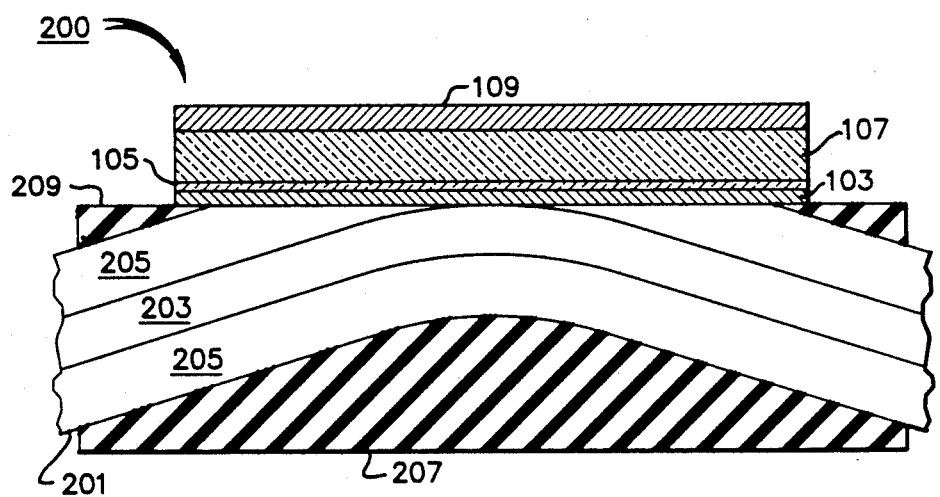

In FIG. 2, an optical article 200 is shown differing from optical article 100 solely by the substitution of an alternative optical coupling support arrangement for the prism. An optical fiber 201 comprised of a core 203 of a material, such as glass or an organic polymer, which is transparent to electromagnetic radiation at the wavelength being propagated. Concentrically surrounding the core is a cladding layer 205 which is similar, but differs in that it exhibits a refractive index which is lower than that of the core. By forming the cladding layer of a lower refractive index material the electromagnetic radiation being propagated is directed back into the core upon impinging the cladding layer. The optical fiber in its curved configuration shown is cast in a mounting block 207. By lapping an optically smooth surface 209 is formed. Lapping removes a portion of cladding layer from the optical fiber, so that its core lies adjacent the optical surface. Layer 103 is then deposited on the optical surface, and the remaining layers of the device are formed as previously described.

Operation of the device 200 can be generally similar to that described above for device 100. Since the optical fiber is locked in position, the optimum angle for directing electromagnetic radition to the reflective metal layer must be determined prior to locating the optical fiber in the casting block. In addition to modulating and switching electromagnetic radiation as described above, it is possible to use the device 200 to remove p- components from the polarized electromagnetic radiation being transmitted in the optical fiber.

Any conventional high $\chi^{(2)}$ poled polymeric layer can be utilized which provides an immobilizing matrix for the organic molecular dipoles at ambient or near ambient temperatures, but requires heating to at least 50° C. (preferably 80° C.) to effect poling, as noted above. The poled polymeric media of Ulman et al and Robello et al, cited above, are specifically contemplated as well as Robello European Patent Application No. 0,313,477, published Apr. 26, 1986, and Scozzafava et al. U.S. Ser. No. 101,897, filed Sept. 28, 1987, commonly assigned, now U.S. Pat. No. 4,792,208.

Specifically preferred organic nonlinear optical layers are those which can be formed by poling linear condensation and vinyl polymers including non-centrosymmetric molecular dipoles as pendant or backbone groups. The molecular dipoles include an electron donor moiety, such as an amino, oxy, or thio group, linked through a conjugated $\pi$ bonding system to an electron acceptor moiety, such as a sulfonyl, cyano, or nitro group, to permit oscillation of the molecular dipole between a lower polarity ground state and a higher polarity excited state. A preferred conjugated $\pi$ bonding system is provided by a 4,4'-stilbene or 4,4'-diazobenzene linkage between the electron acceptor or electron donor moiety. The molecular dipole can be linked to the polymer backbone through the electron donor or acceptor moiety or incorporated in the polymer backbone by linkages through both the electron acceptor and donor moieties.

The following are illustrative of preferred molecular dipole monomers suitable for producing condensation polymers that can be poled to form the nonlinear optical layers:

TABLE I

NOCM-1  4'-{N-[5-(Methoxycarbonyl)pentyl]-N-methylamino}-4-(6-hydroxyhexyl)sulfonylazobenzene NOCM-2  4'-{N-[5-(Butoxycarbonyl)pentyl]-N-methylamino}-4-(6-hydroxyhexyl)sulfonylazobenzene NOCM-3  4'-{N-[5-(Methoxcarbonyl)pentyl]-N-methylamino}-4-(6-hydroxyhexyl)sulfonylstilbene NOCM-4  4'-{N-[5-(Butoxycarbonyl)pentyl]-N-methylamino}-4-(6-hydroxyhexyl)sulfonylstilbene NOCM-5  4'-[N-(Methoxycarbonyl)methyl-N-methylamino]-4-(6-hydroxyhexyl)sulfonylazobenzene NOCM-6  4'-[N-(Ethoxycarbonyl)methyl-N-methylamino]-4-(6-hydroxyhexyl)sulfonylazobenzene NOCM-7  4'-[N-(Methoxycarbonyl)methyl-N-methylamino]-4-(6-hydroxyhexyl)sulfonylstilbene NOCM-8  4'-[N-(Ethoxycarbonyl)methyl-N-methylamino]-4-(6-hydroxyhexyl)sulfonylstilbene NOCM-9  4'-[N-(6-Hydroxyhexyl)-N-methylamino]-4-[2-(methoxycarbonyl)ethyl]sulfonylazobenzene NOCM-10 4'-[N-(6-Hydroxyhexyl)-N-methylamino]-4-[2-(ethoxycarbonyl)ethyl]sulfonylazobenzene NOCM-11 4'-[N-(6-Hydroxyhexyl)-N-methylamino]-4-[2-(methoxycarbonyl)ethyl]sulfonylstilbene NOCM-12 4'-[N-(6-Hydroxyhexyl)-N-methylamino]-4-[2-(ethoxycarbonyl)ethyl]sulfonylstilbene NOCM-13 4'-[N-(2-Hydroxyethyl)-N-methylamino]-4-[2-(methoxycarbonyl)ethyl]sulfonylazobenzene NOCM-14 4'-[N-(2-Hydroxyethyl)-N-methylamino]-4-[2-(ethoxycarbonyl)ethyl]sulfonylazobenzene NOCM-15 4'-[N-(2-Hydroxyethyl)-N-methylamino]-4-[2-(methoxycarbonyl)ethyl]sulfonylstilbene NOCM-16 4'-[N-(2-Hydroxyethyl)-N-methylamino]-4-[2-(ethoxycarbonyl)ethyl]sulfonylstilbene NOCM-17 4'-[N-(2-Hydroxyhexyl)-N-methylamino]-4-[5-(methoxycarbonyl)pentyl]sulfonylazobenzene NOCM-18 4'-[N-(2-Hydroxyhexyl)-N-methylamino]-4-[5-(methoxycarbonyl)pentyl]sulfonylstilbene NOCM-19 4'-(4-Hydroxy-1-piperidinyl)-4-[2-(methoxycarbonyl)ethyl]sulfonylazobenzene NOCM-20 4'-(4-Hydroxy-1-piperidinyl)-4-[2-(methoxycarbonyl)ethyl]sulfonylstilbene The following are illustrative of preferred molecular dipole monomers suitable for producing vinyl polymers that can be poled to form the nonlinear optical layers:

TABLE II

NOVM-1  4'-[N-(2-acryloyloxyethyl-N-methylamino]-4-methylsulfonylstilbene

NOVM-2  4'-[N-(2-methacryloyloxyethyl-N-methylamino]-4-methylsulfonylstilbene

NOVM-3  4'-[N-(6-acryloyloxyhexyl)-N-methylamino]-4-methylsulfonylstilbene

NOVM-4  4'-[N-(6-methacryloyloxyhexyl)-N-methylamino]-4-methylsulfonylstilbene

NOVM-5  4'-[4-acryloyloxy-1-piperidyl]-4-methylsulfonylstilbene

NOVM-6  4'-[4-methacryloyloxy-1-piperidyl]-4-methylsulfonylstilbene

NOVM-7  4'-[N-(2-acryloyloxyethyl)-N-methylamino]-4-phenylsulfonylstilbene

NOVM-8  4'-[N-(2-methacryloyloxyethyl)-N-methylamino]-4-phenylsulfonylstilbene

NOVM-9  4'-[N-(6-acryloyloxyhexyl)-N-methylamino]-4-phenylsulfonylstilbene

NOVM-10 4'-[N-(6-methacryloyloxyhexyl)-N-methylamino]-4-phenylsulfonylstilbene

NOVM-11 4'-[4-acryloyloxy-1-piperidyl]-4-phenylsulfonylstilbene

NOVM-12 4'-[4-methacryloyloxy-1-piperidyl]-4-phenylsulfonylstilbene

NOVM-13 4'-[N-(2-acryloyloxyethyl)-N-methylamino]-4-(R-2-methylbutyl)sulfonylstilbene NOVM-14 4'-[N-(2-methacryloyloxyethyl)-N-methylamino]-4-(R-2-methylbutyl)sulfonylstilbene NOVM-15 4'-[N-(6-acryloyloxyethyl)-N-methylamino]-4-(R-2-methylbutyl)sulfonylstilbene NOVM-16 4'-[N-(6-methacryloyloxyethyl)-N-methylamino]-4-(R-2-methylbutyl)sulfonylstilbene NOVM-17 4'-[4-acryloyloxy-1-piperidyl]-4-(R-2-methylbutyl)sulfonylstilbene NOVM-18 4'-[4-methacryloyloxy-1-piperidyl]-4-(R-2-methylbutyl)sulfonylstilbene NOVM-19 4'-(2-acryloyloxyethoxy)-4-methylsulfonylstilbene NOVM-20 4'-(2-methacryloyloxyethoxy)-4-methylsulfonystilbene NOVM-21 4'-(6-acryloyloxyhexoxy)-4-methylsulfonylstilbene NOVM-22 4'-(6-methacryloyloxyhexoxy)-4-methylsulfonylstilbene NOVM-23 4'-(2-acryloyloxyethoxy)-4-phenylsulfonylstilbene NOVM-24 4'-(2-methacryloyloxyethoxy)-4-phenylsulfonylstilbene NOVM-25 4'-(6-acryloyloxyhexoxy)-4-phenylsulfonylstilbene NOVM-26 4'-(6-methacryloyloxyhexoxy)-4-phenylsulfonylstilbene NOVM-27 4'-(2-acryloyloxyethoxy)-4-(R-2-methylbutyl)-sulfonylstilbene NOVM-28 4'-(2-methacryloyloxyethoxy)-4-(R-2-methylbutyl)sulfonylstilbene NOVM-29 4'-(6-acryloyloxyhexoxy)-4-(R-2-methylbutyl)-sulfonylstilbene NOVM-30 4'-(6-methacryloyloxyhexoxy)-4-(R-2-methylbutyl)sulfonylstilbene NOVM-31 4'-(2-acryloyloxyethylthio)-4-methylsulfonylstilbene NOVM-32 4'-(2-methacryloyloxyethylthio)-4-methylsulfonylstilbene
NOVM-33 4'-(6-acryloyloxyhexylthio)-4-methylsulfonylstilbene
NOVM-34 4'-(6-methacryloyloxyhexylthio)-4-methylsulfonylstilbene
NOVM-35 4'-(2-acryloyloxyethylthio)-4-phenylsulfonylstilbene
NOVM-36 4'-(2-methacryloyloxyethylthio)-4-phenylsulfonylstilbene
NOVM-37 4'-(6-acryloyloxyhexylthio)-4-phenylsulfonylstilbene
NOVM-38 4'-(6-methacryloyloxyhexylthio)-4-phenylsulfonylstilbene
NOVM-39 4'-(2-acryloyloxyethylthio)-4-(R-2-methylbutyl)sulfonylstilbene
NOVM-40 4'-(2-methacryloyloxyethylthio)-4-(R-2-methylbutyl)sulfonylstilbene
NOVM-41 4'-(6-acryloyloxyhexylthio)-4-(R-2-methylbutyl)sulfonylstilbene
NOVM-42 4'-(6-methacryloyloxyhexylthio)-4-(R-2-methylbutyl)sulfonylstilbene
NOVM-43 4'-dimethylamino-4-(6-acryloyloxyhexyl)sulfonylstilbene
NOVM-44 4'-dimethylamino-4-(6-methacryloyloxyhexyl)-sulfonylstilbene
NOVM-45 4'-(1-pyrrolidino)-4-(6-acryloyloxyhexyl)sulfonylstilbene
NOVM-46 4'-(1-pyrrolidino)-4-(6-methacryloyloxyhexyl)-sulfonylstilbene
NOVM-47 4'-[N-(R-2-methylbutyl)-N-methylamino]-4-(6-acryloyloxyhexyl)sulfonylstilbene
NOVM-48 4'-[N-(R-2-methylbutyl)-N-methylamino]-4-(6-methacryloyloxyhexyl)sulfonylstilbene
NOVM-49 4'-methoxy-4-(6-acryloyloxyhexyl)sulfonylstilbene
NOVM-50 4'-methoxy-4-(6-methacryloyloxyhexyl)sulfonylstilbene
NOVM-51 4'(R-2-methylbutoxy)-4-(6-acryloyloxyhexyl)-sulfonylstilbene
NOVM-52 4'(R-2-methylbutoxy)-4-(6-methacryloyloxyhexyl)sulfonylstilbene
NOVM-53 4'-methylthio-4-(6-acryloyloxyhexyl)sulfonylstilbene
NOVM-54 4'-methylthio-4-(6-methacryloyloxyhexyl)-sulfonylstilbene
NOVM-55 4'-(R-2-methylbutylthio)-4-(6-acryloyloxyhexyl)sulfonylstilbene
NOVM-56 4'-(R-2-methylbutylthio)-4-(6-methacryloyloxyhexyl)sulfonylstilbene
NOVM-57 4'-[N-(2-acryloyloxyethyl)-N-methylamino]-4-methylsulfonylazobenzene
NOVM-58 4'-[N-(2-methacryloyloxyethyl)-N-methylamino]-4-methylsulfonylazobenzene
NOVM-59 4'[N-(6-acryloyloxyhexyl)-N-methylamino]-4-methylsulfonylazobenzene
NOVM-60 4'[N-(6-methacryloyloxyhexyl)-N-methylamino]-4-methylsulfonylazobenzene
NOVM-61 4'-[4-acryloyloxy-1-piperidyl]-4-methylsulfonylazobenzene
NOVM-62 4'-[4-methacryloyloxy-1-piperidyl]-4-methylsulfonylazobenzene
NOVM-63 4'-[N-(2-acryloyloxyethyl)-N-methylamino]-4-phenylsulfonylazobenzene
NOVM-64 4'-[N-(2-methyacryloyloxyethyl)-N-methylamino]-4-phenylsulfonylazobenzene
NOVM-65 4'-[N-(6-acryloyloxyhexyl)-N-methylamino]-4-phenylsulfonylazobenezene
NOVM-66 4'-[N-(6-methacryloyloxyhexyl)-N-methylamino]-4-phenylsulfonylazobenzene
NOVM-67 4'-[4-acryloyloxy-1-piperidyl]-4-phenylsulfonylazobenzene
NOVM-68 4'-[4-methylacryloyloxy-1-piperidyl]-4-phenylsulfonylazobenzene
NOVM-69 4'-[N-(2-acryloyloxyethyl)-N-methylamino]-4-(R-2-methylbutyl)sulfonylazobenzene
NOVM-70 4'-[N-(2-methacryloyloxyethyl)-N-methylamino]-4-(R-2-methylbutyl)sulfonylazobenzene
NOVM-71 4'-[N-(6-acryloyloxyhexyl)-N-methylamino]-4-(R-2-methylbutyl)sulfonylazobenzene
NOVM-72 4'-[N-(6-methacryloyloxyhexyl)-N-methylamino]-4-(R-2-methylbutyl)sulfonylazobenzene
NOVM-73 4'-[4-acryloyloxy-1-piperidyl]-4-(R-2-methylbutyl)sulfonylazobenzene
NOVM-74 4'-[4-methacryloyloxy-1-piperidyl]-4-(R-2-methylbutyl)sulfonylazobenzene
NOVM-75 4'-(2-acryloyloxyethoxy)-4-methylsulfonylazobenzene
NOVM-76 4'-(2-methacryloyloxyethoxy)-4-methylsulfonylazobenzene
NOVM-77 4'-(6-acryloyloxyhexoxy)-4-methylsulfonylazobenzene
NOVM-78 4'-(6-methacryloyloxyhexoxy)-4-methylsulfonylazobenzene
NOVM-79 4'-(2-acryloyloxyethoxy)-4-phenylsulfonylazobenzene
NOVM-80 4'-(2-methacryloyloxyethoxy)-4-phenylsulfonylazobenzene
NOVM-81 4'-(6-acryloyloxyhexoxy)-4-phenylsulfonylazobenzene
NOVM-82 4'-(6-methacryloyloxyhexoxy)-4-phenylsulfonylazobenzene
NOVM-83 4'-(2-acryloyloxyethoxy)-4-(R-2-methylbutyl)-sulfonylazobenzene
NOVM-84 4'-(2-methacryloyloxyethoxy)-4-(R-2-methylbutyl)sulfonylazobenzene
NOVM-85 4'-(6-acryloyloxyhexoxy)-4-(R-2-methylbutyl)sulfonylazobenzene
NOVM-86 4'-(6-methacryloyloxyhexoxy)-4-(R-2-methylbutyl)sulfonylazobenzene
NOVM-87 4'-(2-acryloyloxyethylthio)-4-methylsulfonylazobenzene
NOVM-88 4'-(2-methacryloyloxyethylthio)-4-methylsulfonylazobenzene
NOVM-89 4'-(6-acryloyloxyhexylthio)-4-methylsulfonylazobenzene
NOVM-90 4'-(6-methacryloyloxyhexylthio)-4-methylsulfonylazobenzene
NOVM-91 4'(2-acryloyloxyethylthio)-4-phenylsulfonylazobenzene
NOVM-92 4'(2-methacryloyloxyethylthio)-4-phenylsulfonylazobenzene
NOVM-93 4'-(6-acryloyloxyhexylthio)-4-phenylsulfonylazobenzene
NOVM-94 4'-(6-methacryloyloxyhexylthio)-4-phenylsulfonylazobenzene
NOVM-95 4'(2-acryloyloxyethylthio)-4-(R-2-methylbutyl)sulfonylazobenzene
NOVM-96 4'(2-methacryloyloxyethylthio)-4-(R-2-methylbutyl)sulfonylazobenzene
NOVM-97 4'-(6-acryloyloxyhexylthio)-4-(R-2-methylbutyl)sulfonylazobenzene NOVM-98 4'-(6-methacryloyloxyhexylthio)-4-(R-2-methylbutyl)sulfonylazobenzene
NOVM-99 4'-dimethylamino-4-(2-acryloyloxyethyl)-sulfonylazobenzene
NOVM-100 4'-dimethylamino-4-(2-methacryloyloxyethyl)-sulfonylazobenzene
NOVM-101 4'-dimethylamino-4-(6-acryloyloxyhexyl)-sulfonylazobenzene
NOVM-102 4'-dimethylamino-4-(6-methacryloyloxyhexyl)-sulfonylazobenzene
NOVM-103 4'-(1-pyrrolidino)-4-(2-acryloyloxyethyl)-sulfonylazobenzene
NOVM-104 4'-(1-pyrrolidino)-4-(2-methacryloyloxyethyl)sulfonylazobenzene
NOVM-105 4'-(1-pyrrolidino)-4-(6-acryloyloxyhexyl)-sulfonylazobenzene
NOVM-106 4'-(1-pyrrolidino)-4-(6-methacryloyloxyhexyl)sulfonylazobenzene
NOVM-107 4'-dimethylamino-4-(6-acryloyloxyhexyl)-sulfonylazobenzene
NOVM-108 4'-dimethylamino-4-(6-methacryloyloxyhexyl)-sulfonylazobenzene
NOVM-109 4'-(1-pyrrolidino-4-(6-acryloyloxyhexyl)-sulfonylazobenzene
NOVM-110 4'-(1-pyrrolidino-4-(6-methacryloyloxyhexyl)-sulfonylazobenzene
NOVM-111 4'[N-(R-2-methylbutyl)-N-methylamino]-4-(6-acryloyloxyhexyl)sulfonylazobenzene
NOVM-112 4'[N-(R-2-methylbutyl)-N-methylamino]-4-(6-methacryloyloxyhexyl)sulfonylazobenzene
NOVM-113 4'-methoxy-4-(6-acryloyloxyhexyl)sulfonylazobenzene
NOVM-114 4'-methoxy-4-(6-methacryloyloxyhexyl)-sulfonylazobenzene
NOVM-115 4'-(R-2-methylbutoxy)-4-(6-acryloxyhexyl)-sulfonylazobenzene
NOVM-116 4'-(R-2-methylbutoxy)-4-(6-methacryloxyhexyl)sulfonylazobenzene
NOVM-117 4'-methylthio-4-(6-acryloxyhexyl)sulfonylazobenzene
NOVM-118 4'-methylthio-4-(6-methacryloxyhexyl)sulfonylazobenzene
NOVM-119 4'-(R-2-methylbutylthio)-4-(6-acryloxyhexyl)-sulfonylazobenzene
NOVM-120 4'-(R-2-methylbutylthio)-4-(6-acryloxyhexyl)sulfonylazobenzene
NOVM-121 1-(9-julolidinyl)-2-[4-(6-acryloyloxyhexylsulfonyl)phenyl]ethene
NOVM-122 1-(1-butyl-5-indolinyl)-2-[4-(6-methacryloyloxyhexylsulfonyl)phenyl]diimine The following are illustrative of typical vinyl addition monomers that can be copolymerized with the vinyl molecular dipole monomers of Table II, if desired. The vinyl molecular dipole monomers can form 50 to 100 percent of the repeating units of the polymer, with vinyl addition monomers, such as those of Table III, below, forming the balance of the repeating units of the polymer.

Table III

VCOM-1 Methyl acrylate
VCOM-2 Ethyl acrylate
VCOM-3 Butyl acrylate
VCOM-4 t-Butyl acrylate
VCOM-5 Methyl chloroacrylate
VCOM-6 Methyl methacrylate
VCOM-7 Ethyl methacrylate
VCOM-8 Butyl methacrylate
VCOM-9 t-Butylmethacrylate
VCOM-10 Styrene
VCOM-11 4-Methylstyrene
VCOM-12 α-Methylstyrene
VCOM-13 4-t-Butylstyrene
VCOM-14 4-Hydroxystyrene
VCOM-15 4-Methoxystyrene
VCOM-16 4-Acetoxystyrene
VCOM-17 2-Vinylnaphthylene
VCOM-18 Acrylonitrile
VCOM-19 Acrylamide
VCOM-20 N-Phenylmaleimide
VCOM-21 N-Vinylpyrrolidone
VCOM-22 Vinylacetate
VCOM-23 Vinylchloride
VCOM-24 Butadiene
VCOM-25 Isoprene
VCOM-26 Chloroprene Conventional details of device fabrication are also taught by the foregoing NLO citations and are also illustrated by the examples.

EXAMPLES

The following examples illustrate preferred embodiments of the invention. All refractive indices were measured at 632 nm, unless otherwise indicated.

EXAMPLE 1

A glass plate presenting a deposition surface of approximately 20 cm$^2$ was cleaned in successive stages using detergent, deionized water, iso-propyl alcohol, and a high purity toluene vapor reflux. This same cleaning procedure was employed with each of the glass plate and prism substrates of the examples. A thickness of 800 Å of silver was vacuum deposited onto the deposition surface at a rate of 10 Å per second. The vacuum chamber during silver deposition was maintained at $1 \times 10^{-6}$ Torr.

Immediately after silver deposition a 50 Å layer of magnesium fluoride was deposited onto two thirds of the silver layer area at a rate of 3 Å per second and at a vacuum chamber pressure of $1 \times 10^{-6}$ Torr. The sample upon removal from the vacuum chamber was stored under a flowing nitrogen atmosphere.

A copolymer of NOVM-4 and VCOM-13 ($T_g$ 127° C., refractive index 1.549) in the amount of 1.5 g was dissolved in 10 mL of 1,2,3-trichloropropane. The sample was removed from the nitrogen atmosphere and divided into two samples, a larger sample and a smaller sample, each having a portion of the silver layer coated with magnesium fluoride and a remaining portion left unprotected. The smaller sample was used as a control for comparison. The larger sample was placed on the spinning stage of a spin coating machine, and the polymer dispersed in trichloropropane was poured onto its surface through a 0.2 μm pore filter. The larger sample was spun for 10 seconds at 500 r.p.m. and then accelerated to 2000 r.p.m. for an additional 50 seconds. The polymer layer produced was about 1.5 μm thick.

The spin coated larger sample was then placed in a vacuum oven which was evacuated to a pressure of $1 \times 10^{-3}$ Torr. and heated to a temperature of 135° C. over a period of 18 hours, which included 2 hours to reach the baking temperature from ambient and 2 hours to cool down after baking. The temperature of 135° C. was selected to correspond to an appropriate poling temperature of the polymer layer in view of its glass transition temperature.

It was observed after the sample had been removed from the oven that the silver which had not been protected by the magnesium fluoride had lost its shiny appearance, giving a hazy or cloudy appearance. The portion of the larger sample containing the unprotected silver layer scattered a laser beam incident on its surface. The magnesium fluoride protected portion of the larger sample did not differ in appearance from the smaller sample serving as the control. The protected areas appeared shiny and reflective. The protected areas appeared smooth in both darkfield and differential interference contrast light microscopy at 400 times magnification.

EXAMPLE 2

Onto a cleaned flint glass (R.I. 1.712) prism base a 450 Å silver layer was deposited at the rate of 7 Å/sec. Two silica substrates (R.I. 1.457) were placed on opposite sides of the prism during deposition to assist is in accurate determination of layer thickness.

A protective layer was next formed on the reflective silver layer. A 53 Å layer of $MgF_2$ was evaporated at a pressure of less than $1 \times 10^{-5}$ Torr. at a rate of 2 Å/sec.

To form a high $\chi^{(2)}$ polymeric layer a solution of a linear vinyl copolymer of NOVM-4 and 1-methyl-t-butylstyrene (R.I. 1.549, $T_g$ 127° C.) containing organic molecular dipole repeating units comprised of an amino electron donor moiety and a methylsulfonyl electron acceptor moiety linked through a 4,4'-stilbene conjugated $\pi$ bonding system dissolved in doubly distilled trichloropropane was prepared. The solution was applied to the device through a 0.2 $\mu$m filter until the silver layer was entirely covered. The sample was then spun for 10 seconds at 600 rpm after which it was accelerated to 1000 rpm for a further 60 seconds.

The sample was immediately placed in a vacuum oven and baked to evaporate the solvent. The temperature was increased over a period of 2 hours to 95° C. at a reduced pressure of $1 \times 10^{-3}$ Torr. After 16 hours heating was discontinued and the sample was allowed to cool over a period of 3 hours before it was removed from the oven. The thickness of the polymeric layer was observed to be 1.8 $\mu$m.

A gold electrode was next formed over the polymeric layer. Gold in the amount 400 Å was deposited at 5 Å/sec. to form an electrode on the surface of the device. To permit electrical contact to the silver layer for poling, a small area of the second dielectric layer which did not receive gold was removed by swabbing with dichloromethane to expose the underlying silver layer. Phosphor bronze contacts were attached to the exposed reflective silver layer and to the gold electrode using a conductive silver paste.

The polymeric layer was poled at 150 volts and 120° C. for 75 minutes before being allowed to cool to room temperature over a period of 2 hours. The applied voltage was then removed.

Figure 3:
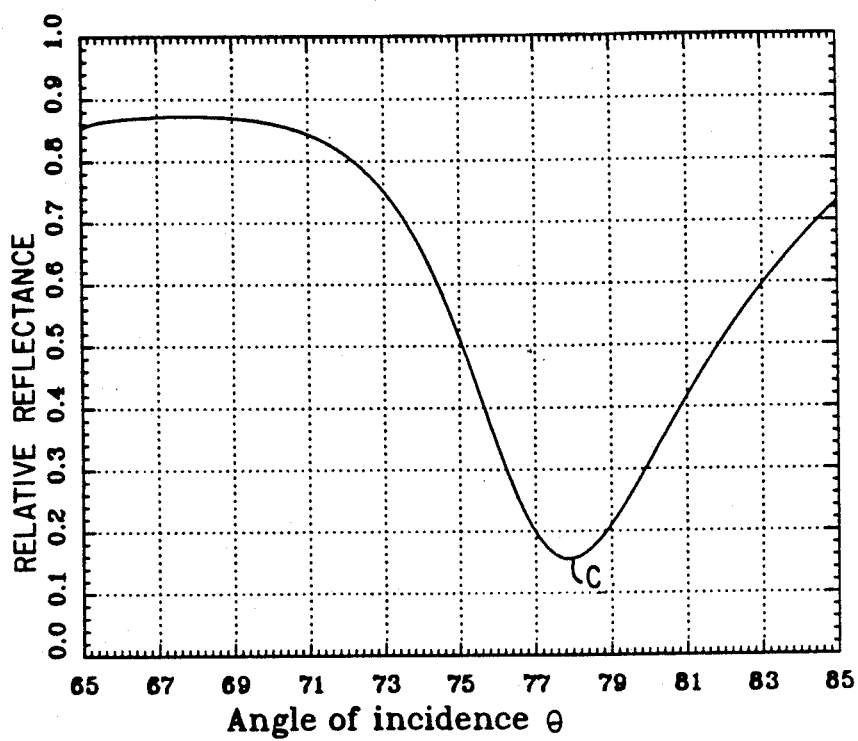
FIG. 3 is a plot of relative reflectance versus the angle of incidence ($\Theta$).

When the completed device was addressed with p-polarized light from a helium neon laser ($\lambda = 632$ nm), it was observed to modulate light in the surface plasmon mode and in a total of 6 guided modes. FIG. 3, which is a plot of reflectance the angle of incidence $\Theta$ over the range of from 65° to 85° shows a reduction of reflectance at C, which corresponds to the surface plasmon mode of operation.

A sinusoidally oscillating voltage with an amplitude of Vo and a frequency of 1 KHz was applied across the second dielectric layer through the reflective silver layer and the gold electrode, causing a time varying change in the refractive index of the of the high $\chi^{(2)}$ polymeric layer. A small positive change in the refractive index of the polymeric layer caused the curve shown in FIG. 3 to shift in the direction of higher values of $\Theta$, changing the reflectance of the device at any selected value of $\Theta$. The modulation of the reflected laser beam, M, defined as the amplitude of the reflectance change divided by the average reflectance, was measured with the following results:

| Vo | M |
|---|---|
| 120 | 0.09 |

The invention has been described in detail with particular reference to preferred embodiments thereof, but it will be understood that variations and modifications can be effected within the spirit and scope of the invention.

What is claimed is:

1. An optical article capable of modulating the reflection of electromagnetic radiation comprising
   a reflective metal layer having a thickness in the range of from 100 to 1000 Å comprised of at least one metal having work function in the range of from 2.5 to 4.5 eV,
   means for directing polarized electromagnetic radiation to and acting as a support for said reflective metal layer,
   a dielectric medium capable of exhibiting a change in its refractive index as a function of an applied electrical potential gradient overlying said reflective metal layer, and
   means for variably applying an electrical potential to a surface of said dielectric medium remote from said reflective metal layer,
   characterized in that
   said dielectric medium is comprised of a poled polymeric layer exhibiting a glass transition temperature of at least 50° C. and a second order polarization susceptibility greater than $10^{-9}$ electrostatic units and
   a protective layer having a thickness of less than 0.1 $\mu$m consisting essentially of at least one of a metal oxide and a metal fluoride is interposed between said reflective metal layer and said poled polymeric layer.

2. An optical article according to claim 1 further characterized in that said metal layer is a silver layer having a thickness in the range of from 150 to 700 Å.

3. An optical article according to claim 1 further characterized in that said poled polymeric medium exhibits a glass transition temperature of at least 80° C.

4. An optical article according to claim 3 further characterized in that said poled polymeric medium contains a nonlinear polymer containing organic molecular dipoles within its repeating units.

5. An optical article according to claim 1 further characterized in that said metal has a work function in the range of from 3.5 to 4.5 eV.

6. An optical article according to claim 5 further characterized in that said metal is chosen from the group consisting of magnesium, indium, titanium, aluminum, nickel, cobalt, zinc, silver, tin, antimony, bismuth, and mixtures thereof.

7. An optical article according to claim 5 further characterized in that said metal is silver.

8. An optical article according to claim 1 further characterized in that said protective layer is comprised of a metal oxide.

9. An optical article according to claim 8 further characterized in that said metal oxide is chosen from the group consisting of rare earth oxides, alkaline earth oxides, alumina, and silica.

10. An optical article according to claim 1 further characterized in that said protective layer is comprised of a metal fluoride.

11. An optical article according to claim 10 further characterized in that said metal fluoride is chosen from the group consisting of alkali metal fluorides, alkaline earth fluorides, and rare earth fluorides.

12. An optical article according to claim 10 further characterized in that said metal fluoride is an alkali metal fluoride.

13. An optical article according to claim 12 further characterized in that said alkali metal fluoride is lithium fluoride.

14. An optical article according to claim 10 further characterized in that said metal fluoride is an alkaline earth fluoride.

15. An optical article according to claim 14 further characterized in that said alkaline earth fluoride is magnesium fluoride.

16. An optical article according to claim 1 further characterized in that said protective layer has a thickness in the range of from 100 to 700 Å.

17. An optical article according to claim 1 further characterized in that said means for directing electromagnetic radiation is a prism.

18. An optical article according to claim 1 further characterized in that said means for directing electromagnetic radiation is a waveguide.

19. An optical article according to claim 18 further characterized in that said waveguide is an optical fiber comprised of a core of a first refractive index and a surrounding cladding layer of a lower refractive index and said metal layer is optically coupled to said core.

20. An optical article according to claim 19 further characterized in that said optical fiber is partially embedded in a dielectric mounting block presenting a planar surface, a portion of said optical fiber form a portion of said planar surface, and said metal layer lies in contact with said portions of said planar surface formed by said mounting block and said optical fiber.

* * * * *